United States Patent [19]

Zajfert

[11] Patent Number: 5,036,162
[45] Date of Patent: Jul. 30, 1991

[54] TRIAXIAL MOUNT

[75] Inventor: Stefan S. Zajfert, Stafford, N.Y.

[73] Assignee: Lapp Insulator Company, LeRoy, N.Y.

[21] Appl. No.: 402,351

[22] Filed: Sep. 1, 1989

[51] Int. Cl.⁵ .............................................. H02G 7/05
[52] U.S. Cl. .................................. 174/43; 174/45 R; 174/148; 174/161 R; 248/278; 403/57
[58] Field of Search .............. 174/40 R, 43, 45 R, 174/141 R, 148, 150, 161 R; 248/65, 278, 281.1, 324; 403/53, 57, 58, 74

[56] References Cited

U.S. PATENT DOCUMENTS

| | | | |
|---|---|---|---|
| 3,296,358 | 1/1967 | Fiero et al. | 174/43 |
| 3,316,342 | 4/1967 | Cofer | 174/45 R |
| 4,711,461 | 12/1987 | Fromberg | 403/57 X |

FOREIGN PATENT DOCUMENTS 465699 5/1937 United Kingdom ................ 248/278

Primary Examiner—Laramie E. Askin

[57] ABSTRACT

A mount for securing a load, for example a strut insulator, to a stationary support has a pair of end parts one of which is fixed to the load and the other of which is fixed to the support and a pair of respective intermediate parts. Respective end pivots connect the intermediate parts to the end parts for pivoting thereon about respective axes that are perpendicular to each other and a central pivot connects the intermediate parts to each other for relative pivoting about a center axis lying substantially perpendicular to the end axes. One of these end axes is at least generally horizontal and at least generally aligned with the load.

9 Claims, 2 Drawing Sheets 5,036,162

TRIAXIAL MOUNT

FIELD OF THE INVENTION

The present invention relates to a triaxial mount. More particularly this invention concerns a mount for strut-type high-voltage insulators.

BACKGROUND OF THE INVENTION

It is standard as described in commonly owned U.S. Pat. No. 3,002,043 to carry a high-voltage conductor by means of an assembly of suspension and strut insulators. Each string of suspension insulators is paired with a strut insulator. One end of each string of suspension insulators and one end of each strut insulator are connected to a high-voltage transmission tower. The other ends are connected together to provide support for the conductor. The strings of suspension insulators are mounted at least partially in a vertical position and are designed to withstand tension loads from the weight of the conductor. The strut insulators are designed for compression loads and generally extend in or close to a horizontal plane from the tower. The suspension-insulator string and the strut insulator form a vertical plane perpendicular to the conductor.

In a case of uneven conductor spans or one span partially covered by a forest, hill, or the like, a wind blowing perpendicularly to a conductor will cause a longitudinally unbalanced load, causing in turn a bending of the strut. This uneven longitudinal tension of the conductor can be relieved by providing a horizontal hinge on the strut at the tower end. To provide a flexible way of stabilizing the longitudinal motion of the conductor, this assembly is equipped with two additional elements: a vertical hinge and a so-called stub arm. The latter is a rigid extension of the tower in line with the suspension insulator string. The outboard end of the strut insulator is connected to the end of the stub arm by a suspension string of a fixed length. As the strut swings horizontally to one side or the other, its outboard end rotates on the horizontal hinge around the end of the stub arm at a fixed distance causing it to lift up. Thus, the lifting up of the conductor provides a counterbalance to its longitudinal motion. Such insulator assemblies are commonly known as "horizontal vee" assemblies.

Another arrangement designed to support a high-voltage conductor while allowing some degree of longitudinal motion is a so-called "tie back." This is typically made of three strings of insulators: one horizontal compressive strut member and two strings of suspension insulators. The inboard end of the strut insulator is connected to a transmission tower through two hinges allowing the strut to rotate horizontally and vertically. The attachment points of the suspension strings to the tower are above the strut insulator, one on each side of the strut. The bottom ends of the suspension strings are tied together and support the outboard end of the strut insulator. The plane formed by both suspension strings is inclined to the horizontal. When longitudinally unbalanced conductor loads cause the strut to swing horizontally, its outboard end starts to rotate around the point of attachment of one of the suspension strings to the tower. The further the strut insulator swings horizontally, the higher its end is lifted up by its supporting suspension string. Thus the weight of the lifted conductor provides a counterbalance to its longitudinal movement.

When the strut insulator is in its balanced position, both suspension insulators pull its outboard end with equal forces in different directions. Due to the unbalanced conductor tensions when the strut swings horizontally, one suspension string loses its tension and the outboard end of the strut insulator is pulled to the opposite side by the other suspension string. Since the point of attachment of the suspension strings is not exactly in the longitudinal centerline of the strut insulator but somewhat off-center, this force creates a torsion on the strut. Since the offset arm is relatively short, this torsion is also small and is negligible.

In heavy-duty systems, two or more parallel strut insulators as well as suspension strings may be necessary to meet load requirements of the transmission line. As the outboard yoke plate increases in size to accommodate additional strut insulators, the distance between the vertical load from the conductor and the point of support of each suspension string increases considerably and increases torsion on the system. When an unbalanced longitudinal load moves the strut assembly laterally, the suspension of that side loses tension and all the vertical load is supported by only one suspension. This unbalanced unilateral support produces a high level of torsion on the system, that is, on the strut assembly, on the double-hinged inboard yoke plate between the struts and the tower, on the tower bolts, and on the tower cross arms.

The elimination of this torsional stress can be addressed in two ways. The first is by attaching the suspensions to the outboard yoke at a single point beyond the ends of the struts. This creates several problems. To avoid interference between suspension strings and a relatively large yoke plate, it is necessary to attach the suspension strings to the yoke plate at a location relatively far from the ends of the struts. This increases the effective length of the strut assembly and decreases its buckling strength. An increase in the effective length decreases the angle between the suspension strings and the strut assembly and puts an even greater compressive load on the struts. Both factors drastically limit loading capacity of the system. The second solution is shortening the struts. This decreases arcing distance and insulating capacity of the struts, a clearly unsatisfactory approach.

OBJECTS OF THE INVENTION

It is an object of this invention to provide an improved triaxial mount usable generally to suspend anything from a support which must be able to have three degrees of freedom.

It is a more specific object of the present invention to provide an improved triaxial mount for a strut insulator.

Another object of the invention is the provision of such an improved mount for a strut insulator which overcomes the above-given disadvantages, that is, which allows the strut to be dimensioned sufficiently for good electrical and mechanical properties, and yet which will avoid torsionally overloading it.

A further object of the invention is to provide an improved insulator assembly, in particular one with double strut insulators.

SUMMARY OF THE INVENTION

A mount for securing the inboard end of a load exemplified, for instance, by a pair of horizontally elongated strut insulators, to a stationary support according to this invention has a pair of end parts one of which is fixed to the load and the other of which is fixed to the support and a pair of respective intermediate parts. Respective end pivots connect the intermediate parts to the end parts for pivoting thereon about respective axes that are perpendicular to each other and a central pivot connects the intermediate parts to each other for relative pivoting about a center axis lying substantially perpendicular to the end axes. One of these end axes is at least generally horizontal and at least generally aligned with the load.

Thus, with the system of this invention when, for instance, the system is used as an insulator mount, and when a longitudinal tug on the conductor or line causes the connection node to lift and twist, the entire strut can twist to follow this action. This allows the strut insulators to be of full length, with the suspension insulators connected to the node or yoke plate at locations offset longitudinally, that is, in the direction of the conductor, from the centerline of the strut insulator or insulators. As a result, standard parts, except, of course, for the mount, can be used without in any way subjecting the strut to excessive torsional loading.

According to another feature of this invention, one of the end axes is horizontal.

An insulator assembly according to this invention therefore comprises at least one horizontally elongated strut insulator having an inboard end juxtaposed with the tower and an outboard end remote therefrom, a pair of elongated suspension insulators each having an upper and inboard end secured to the tower and an outboard end juxtaposed with the outboard end of the strut insulator, a yoke at and connected to all of the outboard ends, and a hanger for connecting the conductor to the yoke. The mount secures the inboard ends of the strut insulator to the support tower.

In accordance with further features of this invention, the suspension insulators generally symmetrically horizontally flank the strut insulator and extend at acute angles thereto. Furthermore, the strut insulator has a generally horizontal centerline and the yoke is a plate having a pair of attachment locations offset from and horizontally flanking the centerline and connected to the outboard ends of the suspension insulators. This arrangement is particularly effective when, according to the invention, the strut insulator is formed by a pair of horizontal such insulators having outboard ends connected to the yoke plate between the attachment locations and inboard ends connected to the respective end part of the mount.

BRIEF DESCRIPTION OF THE DRAWING

The above and other objects, features, and advantages will become more readily apparent from the following, reference being made to the accompanying drawings in which.

DETAILED DESCRIPTION

Figure 1:
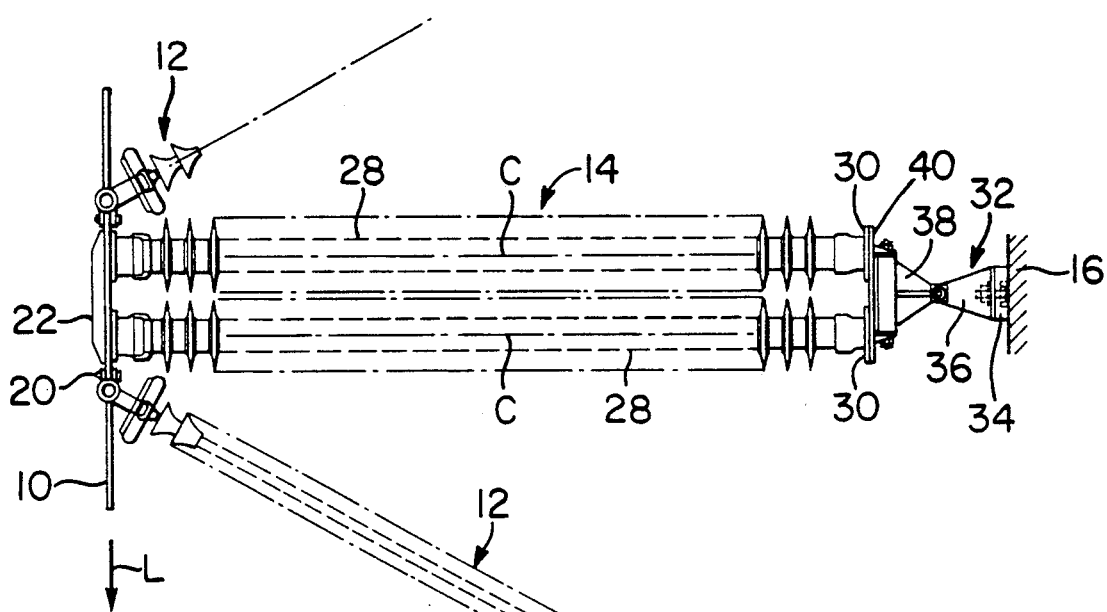
FIG. 1 is a small-scale top view of an insulator assembly according to this invention.
Figure 2:
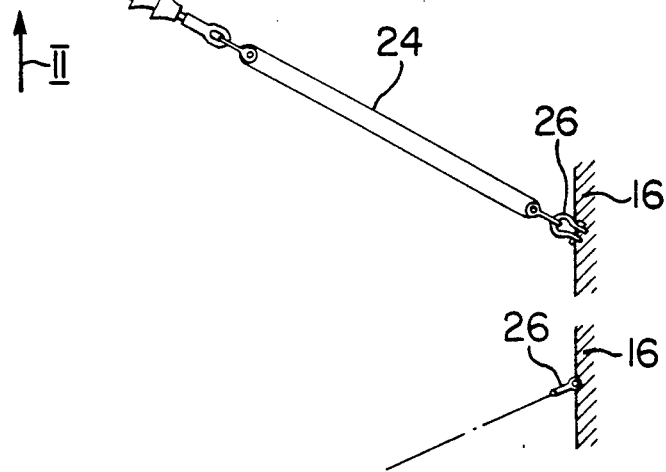
FIG. 2 is a side view taken in the direction of arrow II of the assembly of FIG. 1.
Figure 2:
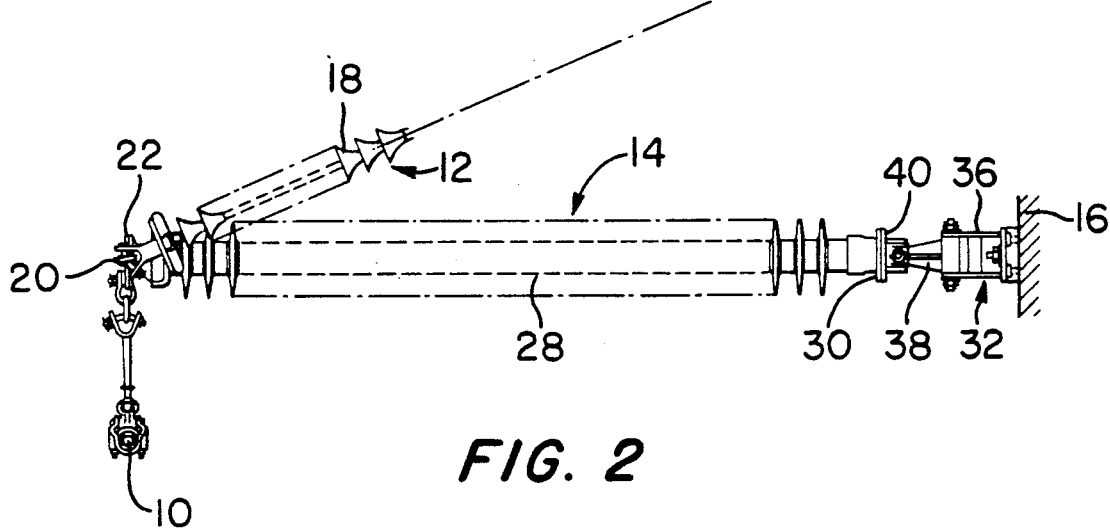

As seen in FIGS. 1 and 2, a support assembly for a high-voltage line 10 is basically formed by a pair of tension-member assemblies 12 (one of which is shown only partially) and a strut 14 which serve to carry the conductor or line 10 from a stationary support here constituted by a tower shown schematically at 16.

Each tension member assembly 12 comprises a tension-resisting suspension insulator string 18 having an outboard end connected via a shackle 20 to a respective end of a yoke plate 22 and an inboard end connected via a strap 24 to another shackle 26 on the support tower 16.

The strut 14 is formed by a pair of identical compression-resisting insulators 28 having horizontal centerlines C that are parallel and next to each other and that have outboard ends fixed in the yoke plate 22 and inboard ends 30 secured by a mount 32 to the tower 16.

Figure 3:
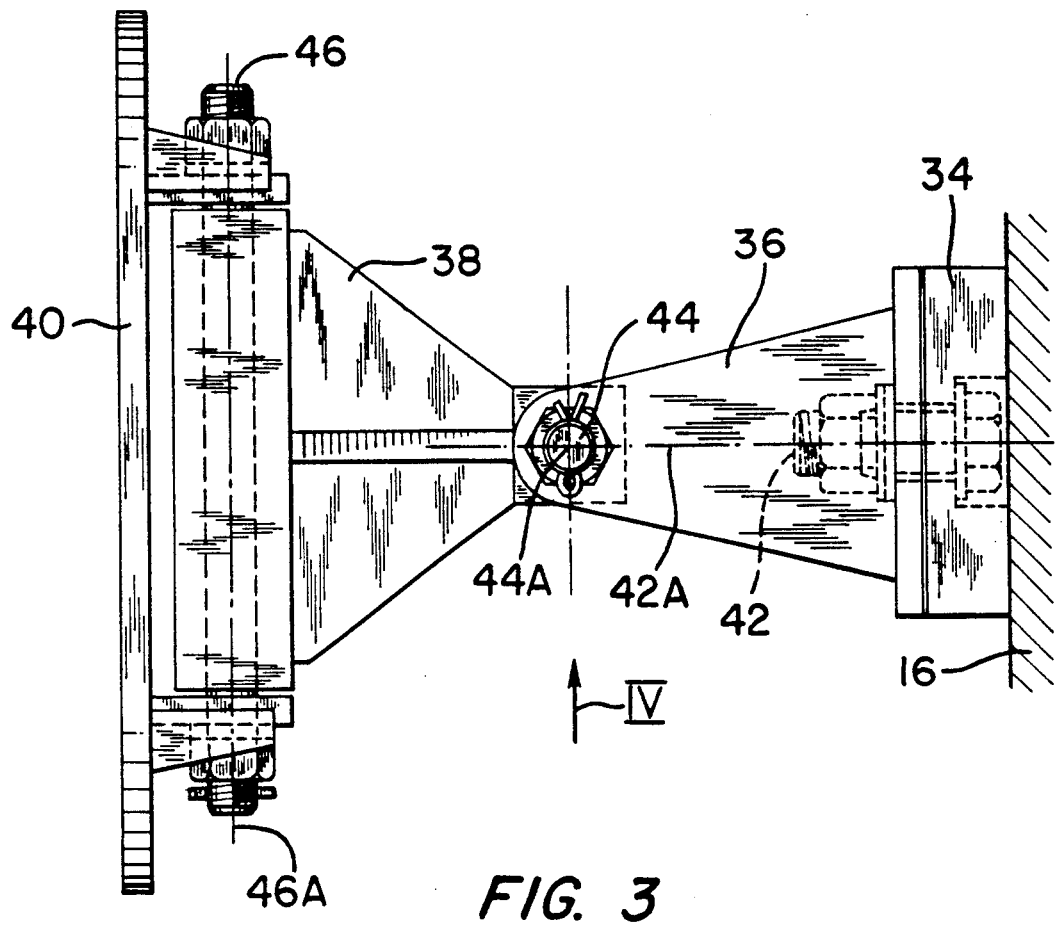
FIG. 3 is a larger-scale top view of the mount according to this invention.
Figure 4:
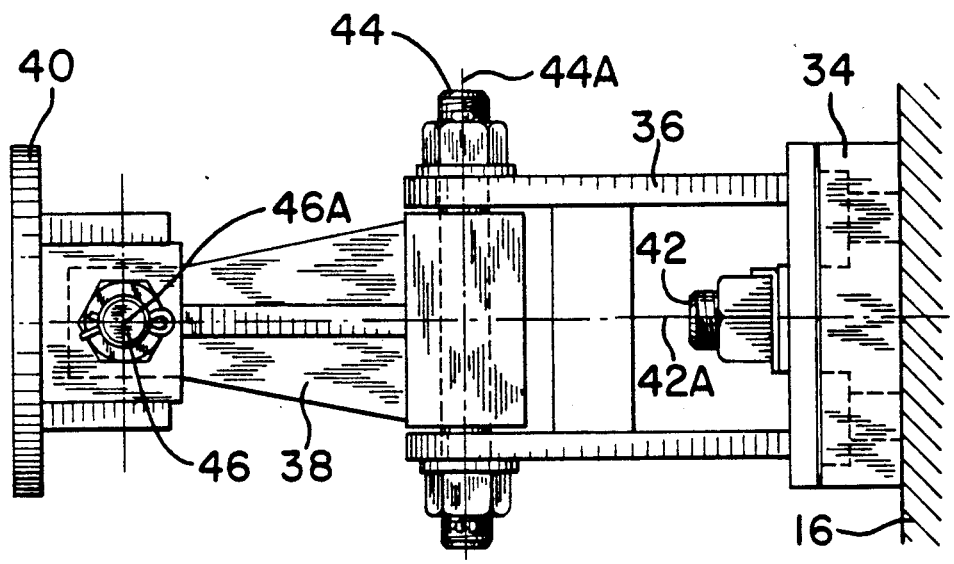
FIG. 4 is a view taken in the direction of arrow IV of FIG. 3.

The mount 32 according to this invention is shown in detail in FIGS. 3 and 4 and is formed by an end plate 34 bolted to the tower 16, a pair of intermediate elements 36 and 38, and an end plate 40 to which the ends 30 of the two insulators 28 are bolted. A bolt 42 defining a horizontal axis 42A parallel to and midway between the centerlines C (FIG. 1) of the two insulators 28 secures the parts 34 and 36 together while permitting them to rotate relative to each other about this axis 42A. Another bolt 44 defining a vertical axis 44A perpendicular to and intersecting the axis 42A secures the parts 36 and 38 together while permitting them to pivot relative to each other about this axis 44A. Similarly a third bolt 46 defining a horizontal axis 46A mounts the parts 38 and 40 together while permitting them to pivot relative to each other about this axis 46A.

Thus, even though the attachments 20 of the tension member assemblies 12 are not on the centerlines C, when the conductor 10 moves longitudinally as shown by arrow L in FIG. 1, the entire strut assembly 14 can twist about the axis 42A, completely relieving the strut 14 of any torsional load. This allows use of full-size strut insulators without in any way compromising the electrical or mechanical properties of the insulator assembly.

Although in the foregoing the load being carried by the triaxial mount according to this invention is mainly described as being a strut insulator to which is attached a high voltage conductor, the invention is not limited to this use of the mount. It can be used to attach other loads in construction situations where it is necessary that the attached load be able to move in any or all of three directions relative to its support.

I claim:

1. An assembly for supporting a conductor, the assembly comprising:
   a tower;
   a horizontally extended strut insulator having an inboard end juxtaposed with the tower and an outboard end remote therefrom;
   a pair of elongated tension insulator assembles each having an upper inboard end secured to the tower and an outboard and juxtaposed with the outboard end of the strut insulator;
   a yoke at and connected to all of the outboard ends;
   means for connecting the conductor to the yoke; and
   a mount comprising
      a pair of end parts, one of which is fixed to the inboard end of the strut insulator and the other of which is fixed to the tower;
      a pair of respective intermediate parts;

respective end pivots connecting the intermediate parts to the end parts for pivoting thereon about respective end axes lying substantially perpendicular relative to each other; and a central pivot connecting the intermediate parts to each other for relative pivoting about a center axis lying substantially perpendicular to the end axes, one of the end axes being horizontal and at least generally aligned with the strut insulator.

2. The insulator assembly defined in claim 1 wherein the tension insulator assemblies generally symmetrically horizontally flank the strut insulator and extend at acute angles thereto.

3. The insulator assembly defined in claim 2 wherein the strut insulator has a generally horizontal centerline and the yoke is a plate having a pair of attachment locations offset from and horizontally flanking the centerline and connected to the outboard ends of the tension insulator assemblies.

4. The insulator assembly defined in claim 3 wherein the strut insulator is formed by a pair of horizontal insulators having outboard ends connected to the yoke plate between the attachment locations and inboard ends connected to the respective end part of the mount.

5. An assembly for supporting a load, the assembly comprising:
a support member;
a horizontally extended compressive strength member having an inboard end juxtaposed with the support member and an outboard end remote therefrom;
at least a first elongated tension strength member having an upper inboard end secured to the support member and an outboard end juxtaposed with the outboard end of the compressive strength member;
a yoke at and connected to the outboard ends; means for connecting the load to the yoke; and a mount comprising
a pair of end parts, one of which is fixed to the inboard end of the compressive strength member and the other of which is fixed to the support member;
a pair of respective intermediate parts;
respective end pivots connecting the intermediate parts to the end parts for pivoting thereon about respective end axes lying substantially perpendicular relative to each other; and
a central pivot connecting the intermediate parts to each other for relative pivoting about a center axis lying substantially perpendicular to the end axes, one of the end axes being horizontal and at least generally aligned with the compressive strength member.

6. The assembly defined in claim 5 further comprising a second elongated tension strength member like said first elongated tension strength member and having an upper inboard end secured to the support member and an outboard end juxtaposed with the outboard end of the compressive strength member.

7. The assembly defined in claim 6 wherein the tension strength members generally symmetrically horizontally flank the compressive strength member.

8. The assembly defined in claim 7 wherein the compressive strength member has a generally horizontal centerline and the yoke is a plate having a pair of attachment locations offset from and horizontally flanking the centerline and connected to the outboard ends of the tension strength members.

9. The assembly defined in claim 8 wherein the compressive strength member is formed by a pair of horizontal compressive strength members having outboard ends connected to the yoke plate between the attachment locations and inboard ends connected to the respective end part of the mount.

* * * * *